US012005549B2

(12) United States Patent
Thompson

(10) Patent No.: US 12,005,549 B2
(45) Date of Patent: Jun. 11, 2024

(54) REVERSING LEVER

(71) Applicant: Snap-on Incorporated, Kenosha, WI (US)

(72) Inventor: Christopher D. Thompson, Franklin, WI (US)

(73) Assignee: Snap-on Incorporated, Kenosha, WI (US)

( * ) Notice: Subject to any disclaimer, the term of this patent is extended or adjusted under 35 U.S.C. 154(b) by 286 days.

(21) Appl. No.: 16/002,234

(22) Filed: Jun. 7, 2018

(65) Prior Publication Data

US 2019/0375075 A1 Dec. 12, 2019

(51) Int. Cl.
*B25B 13/46* (2006.01)
*B25B 23/00* (2006.01)

(52) U.S. Cl.
CPC ........ *B25B 13/463* (2013.01); *B25B 23/0007* (2013.01)

(58) Field of Classification Search
CPC .......................... B25B 13/463; B25B 23/0007
USPC .......................................... 81/63.2, 63.1, 63
See application file for complete search history.

(56) References Cited

U.S. PATENT DOCUMENTS 5,913,954 A 6/1999 Arnold et al.
5,957,009 A 9/1999 McCann
6,575,060 B1 * 6/2003 Tseng .................... B25B 13/463 81/62
6,904,832 B1 6/2005 Chen
6,945,141 B2 9/2005 Hu
6,964,216 B2 11/2005 Chen
7,114,415 B1 10/2006 Chiang
7,124,664 B1 10/2006 Lee
7,207,244 B2 4/2007 Chen
7,231,851 B2 6/2007 Tuan-Mu
8,375,828 B2 2/2013 Chen
8,683,894 B1 4/2014 Chen et al.
8,720,308 B2 5/2014 Hopper et al.
9,038,507 B2 5/2015 Foster et al.
2002/0166417 A1 * 11/2002 Hu ........................ B25B 13/463 81/63.2
2004/0035257 A1 * 2/2004 Tuan-Mu .............. B25B 13/463 81/63.2

(Continued)

FOREIGN PATENT DOCUMENTS

CN 1332784 C 8/2007
CN 100339187 C 9/2007

(Continued)

OTHER PUBLICATIONS

United Kingdom Combined Search and Examination Report for Application No. GB1907263.6, dated Sep. 27, 2019, 9 pages.

(Continued)

*Primary Examiner* — Eric J Rosen
*Assistant Examiner* — Marcel T Dion
(74) *Attorney, Agent, or Firm* — Seyfarth Shaw LLP

(57) ABSTRACT

A reversing lever with a compact structure is disclosed. The reversing lever can include an upper portion operable by a user to select a desired rotational direction of the tool, and a lower portion that selectively engages at pawl to choose the desired torque application. The body of the upper portion can be located between the internal wall of a ratchet head and a rear side of the lower portion of the lower portion to allow a compact reversing lever.

10 Claims, 7 Drawing Sheets

(56) References Cited

U.S. PATENT DOCUMENTS

| | | | |
|---|---|---|---|
| 2005/0092135 A1 | 5/2005 | Chen et al. | |
| 2005/0092136 A1 | 5/2005 | Chen | |
| 2005/0103166 A1* | 5/2005 | Chen | B25B 13/463 81/63.2 |
| 2005/0126347 A1* | 6/2005 | Chen | B25B 13/463 81/63.2 |
| 2006/0000317 A1* | 1/2006 | Chen | B25B 13/463 81/63.2 |
| 2008/0229887 A1* | 9/2008 | Thompson | B25B 13/463 81/62 |
| 2009/0007731 A1* | 1/2009 | Chen | B25B 13/463 81/62 |
| 2013/0283982 A1 | 10/2013 | Hopper et al. | |
| 2017/0059021 A1* | 3/2017 | Thompson | B25B 13/46 |
| 2018/0099385 A1 | 4/2018 | Chung et al. | |

FOREIGN PATENT DOCUMENTS

| | | |
|---|---|---|
| CN | 200963800 Y | 10/2007 |
| CN | 101264595 A | 9/2008 |
| CN | 101323103 A | 12/2008 |
| CN | 101337343 | 1/2009 |
| DE | 10239053 A1 | 8/2003 |
| DE | 202016105779 | 3/2017 |
| DE | 202017102185 | 8/2017 |
| TW | M247346 | 10/2004 |
| TW | M546884 | 8/2017 |

OTHER PUBLICATIONS

Taiwan Office Action for Application No. 10821192270, dated Dec. 16, 2019, 7 pages.

Australian Examination Report No. 1 for Application No. 2019203418 dated Feb. 12, 2020, 4 pages.

Canadian Office Action for Application No. 3,043,785, dated May 22, 2020, 4 pages.

Chinese Office Action for Application No. 201910492897.7 dated Aug. 28, 2020, 8 pages.

Chinese Office Action for corresponding CN Application No. 201910492897.7 dated May 7, 2021, 5 pages.

Chinese Office Action for corresponding Application No. 201910492897.7 dated Nov. 26, 2021, 5 pages.

Chinese Office Action for corresponding Application No. 201910492897.7 dated May 5, 2022, 4 pages.

* cited by examiner

REVERSING LEVER

TECHNICAL FIELD OF THE INVENTION

The present invention relates generally to reversing levers. More particularly, the present invention relates to a two part reversing lever that allows for a more compact ratchet head.

BACKGROUND OF THE INVENTION

Ratchet wrenches and other ratchet tools are commonplace in professional or do-it-yourself settings. These tools allow the user to rotate the tool in a first rotational direction to apply a first torqueing application in a desired direction, and then to return the tool to the original position and apply a second torqueing application in the same direction. The act of returning the tool to the original position does not apply a reverse torque on the work piece because of a pawl mechanism that engages the gear during the application of torque, but that slips about the gear when returning to the original position.

Ratchet tools include reversing levers that allow the user to select either the clockwise or counterclockwise rotational torque applications. For example, a tool operating in the clockwise direction applies torque when rotated in a clockwise direction, and ratchets in the counterclockwise direction. Likewise, a tool operating in the counterclockwise direction applies torque when rotated in a counterclockwise direction, and ratchets in the clockwise direction. A reversing lever is typically used to switch the tool between the clockwise and counterclockwise applications by engaging a selected pawl into the ratchet gear based on the user rotating a lever actuator on the reversing lever.

Many reversing levers require large cavities in the ratchet head of the tool, with covers and screws enclosing the cavity. Other reversing levers require a large bushing and a screw that holds the reversing lever in place.

SUMMARY OF THE INVENTION

The present invention broadly comprises a reversing lever with upper and lower portions coupled together. The upper portion can be operated by a user to select the desired rotational torque application of the tool (i.e., clockwise or counterclockwise), and the lower portion can engage the selected pawl to cause operation in the desired state. The body of the upper portion can be located between an internal wall of the ratchet head housing and a rear side of the lower portion of the lower portion to provide a compact reversing lever.

For example, in an embodiment, the present invention broadly comprises a ratchet head including a housing, a cavity defined within the housing and delineated by an internal wall of the housing, an opening defined within the housing and receiving an annular gear having circumferentially disposed gear teeth, and a reversing lever. The reversing lever includes an upper portion including a lever actuator and a lower portion coupled to the upper portion and including a hook. Further included is a pawl mechanism including a pawl having a post. The hook of the lower portion engages the post upon selective rotational movement of the lever actuator to cause the selected pawl to cooperatively engage the teeth of the gear.

The present invention also broadly comprises a ratchet head including a housing, a cavity defined within the housing and being delineated by an internal wall of the housing, and an opening defined within the housing and receiving an annular gear having circumferentially disposed gear teeth and a reversing lever. The reversing lever includes an upper portion including a lever actuator and a body extending opposite the lever actuator, and a lower portion coupled to the upper portion. Further included is a pawl mechanism including a pawl that selectively cooperatively engages the gear teeth upon selective movement of the reversing lever. The upper portion has a body with a first side and a second side opposite the first side. The first side is disposed proximate the internal wall of the housing and the second side disposed proximate the lower portion.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
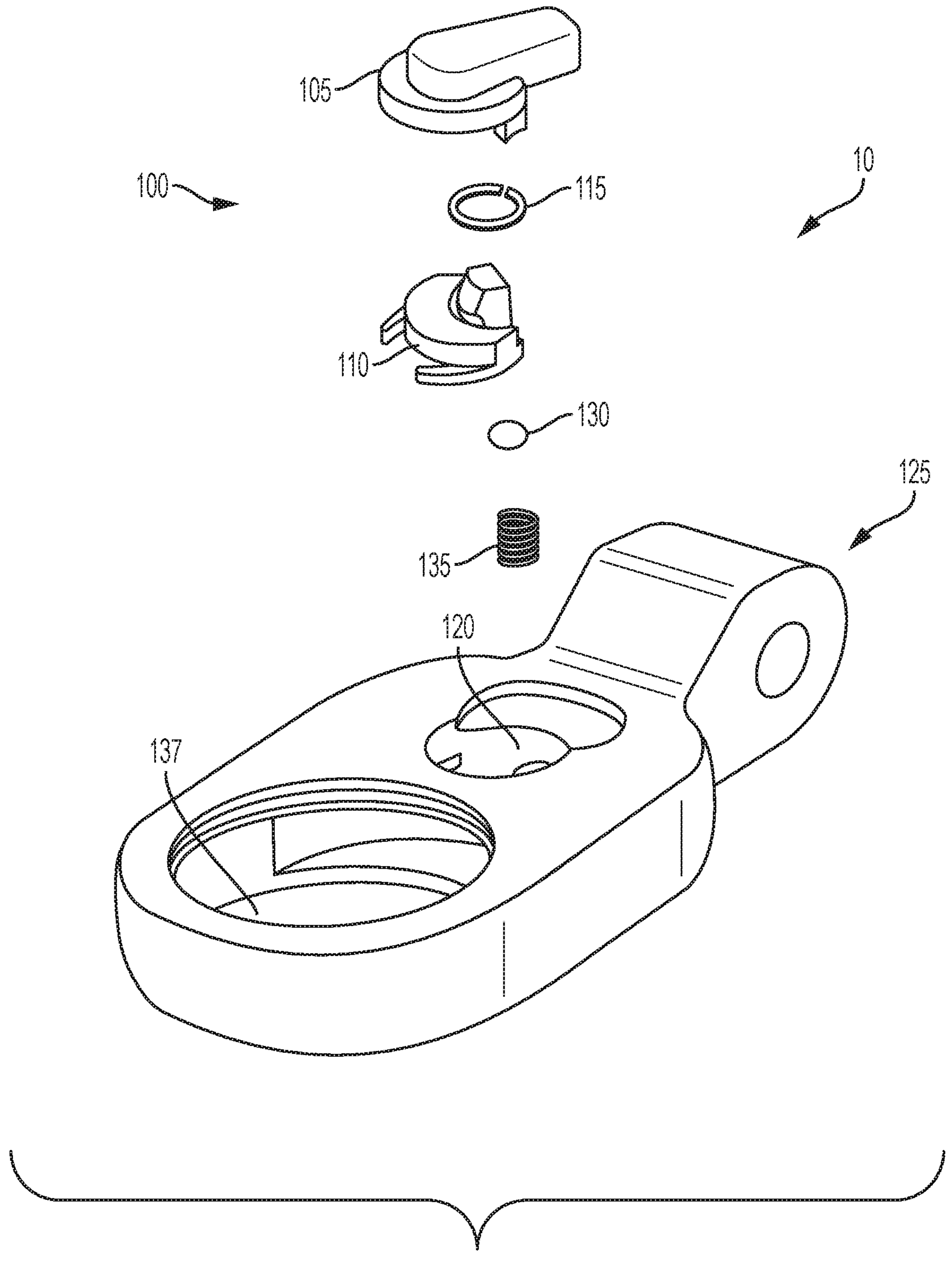
FIG. 1 is an exploded, disassembled, top perspective view of a ratchet head according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a reversing lever with a compact structure. In an embodiment, the reversing lever of the present invention can include upper and lower portions coupled together. The upper portion is operable by a user to select either one of first and second rotational torque application directions (such as, for example, clockwise or counterclockwise) for the tool, and the lower portion can cause the engagement of the selected pawl to operate in the desired torque application direction. The body of the upper portion can be located between an internal wall of the ratchet head and a rear side of the lower portion of the lower portion to allow a compact reversing lever.

Referring to FIG. 1, in an embodiment, a ratchet head 10 can include a reversing lever 100 having an upper portion 105 coupled to a lower portion 110 via a ring 115. The upper portion 105 can alternatively be coupled to the lower portion 110 via any other structure without departing from the spirit and scope of the present invention. The reversing lever 100 can be inserted into a cavity 120 of the ratchet head 10. For example, the ratchet head 10 can include a housing 125 that the cavity 120 is defined within. A ball 130 and bias member 135, such as, for example, a bias spring, can also be inserted into the cavity 120 and coupled to the reversing lever 100 to provide a tactile indication to the user when the user selectively rotates the reversing lever 100 between the clockwise and counterclockwise torque application directions, as discussed further below.

Figure 2A:
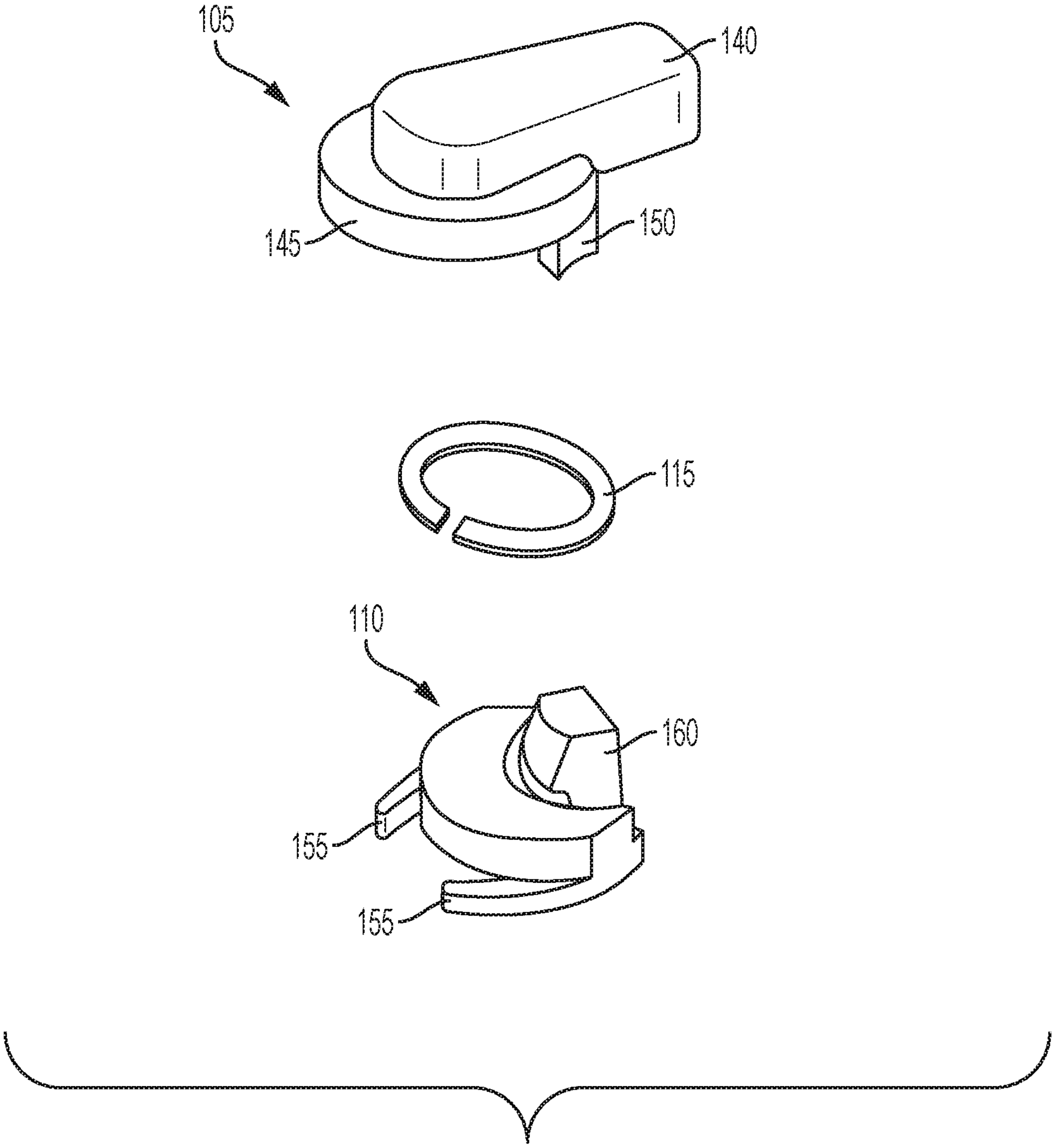
FIG. 2A is an exploded, disassembled top perspective view of a reversing lever according to an embodiment of the present invention.
Figure 2B:
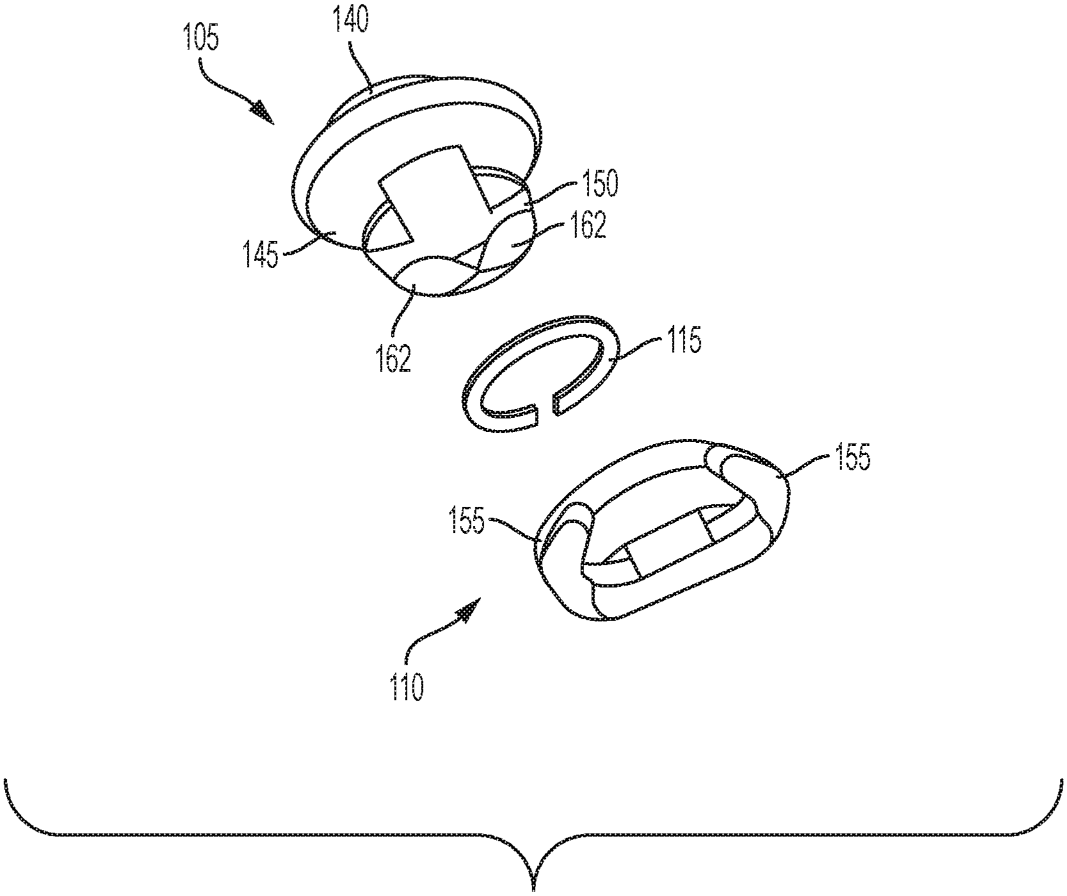
FIG. 2B is an exploded, disassembled lower perspective view of a reversing lever according to an embodiment of the present invention.

Referring to FIGS. 2A and 2B, the upper portion 105 can include a lever actuator 140 that can be selectively rotated by a user to select either one of the clockwise and counterclockwise torque application directions. The lever actuator 140 can be coupled to, or integrally formed as part of, a base 145 of the upper portion 105, and a body 150 can also be coupled to the base 145 and extend downwardly.

The lower portion 110 can include hooks 155 that engage respective posts of pawls to select the desired pawl, as discussed further below. The lower portion 110 can also include an extension 160 that inserts into a complementary opening of the upper portion 105 to effectively mate with the upper portion 110 and provide an additional structural coupling with the upper portion 105 beyond that provided by the ring 115 or other coupling structures.

In an embodiment, the reversing lever 100 can provide a tactile indication when the user selectively rotates the reversing lever 100 between the clockwise and counterclockwise torque application directions, thus providing a tactile indication that the desired rotational torque application direction has been selected. For example, the reversing lever 100 can include two indents 162: a first indent 162 that engages the ball 130 based on the force of the bias member 135 when the reversing lever 100 is moved to the first torque application direction (e.g., clockwise), and a second indent 162 that engages the ball 130 based on the force of the bias member 135 when the reversing lever 100 is selectively moved to the second torque application direction (e.g., counterclockwise). When the user rotates the reversing lever to either operational direction, the ball 130 engages the indent 162 based on the force of the bias member 135, providing the user with a tactile indication that the reversing lever 100 has successfully reached the selected torque application direction.

Figure 3:
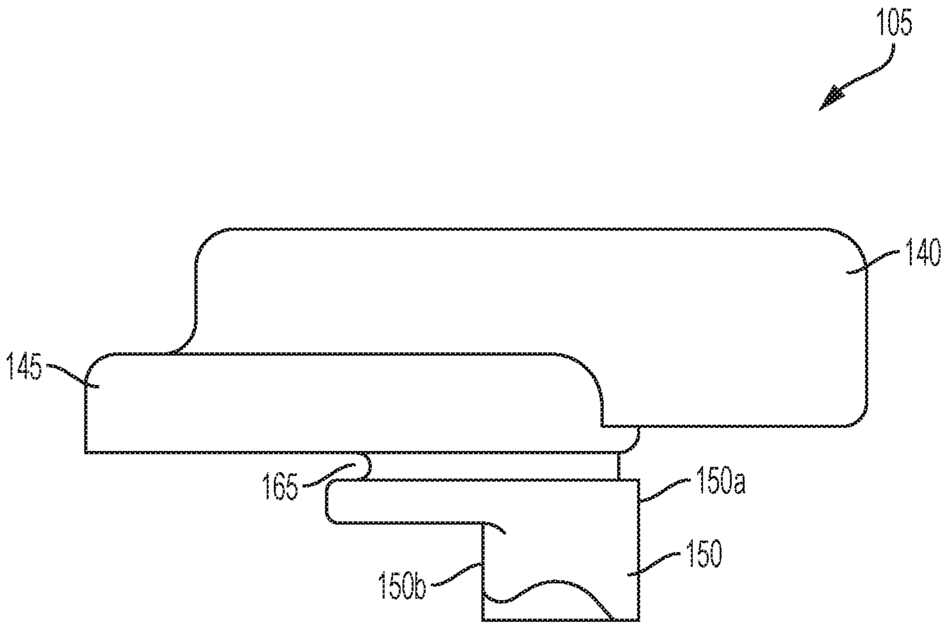
FIG. 3 is a side view of an upper portion of a reversing lever according to an embodiment of the present invention.

Referring to FIG. 3, in an embodiment, the upper portion 105 can include an annular groove 165 that cooperatively receives a ring 115 to cooperatively couple the upper portion 105 to the lower portion 110. The body 150 can also include opposing first and second sides 150*a*, 150*b*. As discussed further below, the first side 150*a* can be located adjacent to an inner wall of the bore of the housing 125 and the second side 150*b* can be located adjacent the lower portion 110. This allows the reversing lever 100 to be disposed within the cavity 120 and set back into the bore, allowing a compact reversing lever 100.

Figure 4:
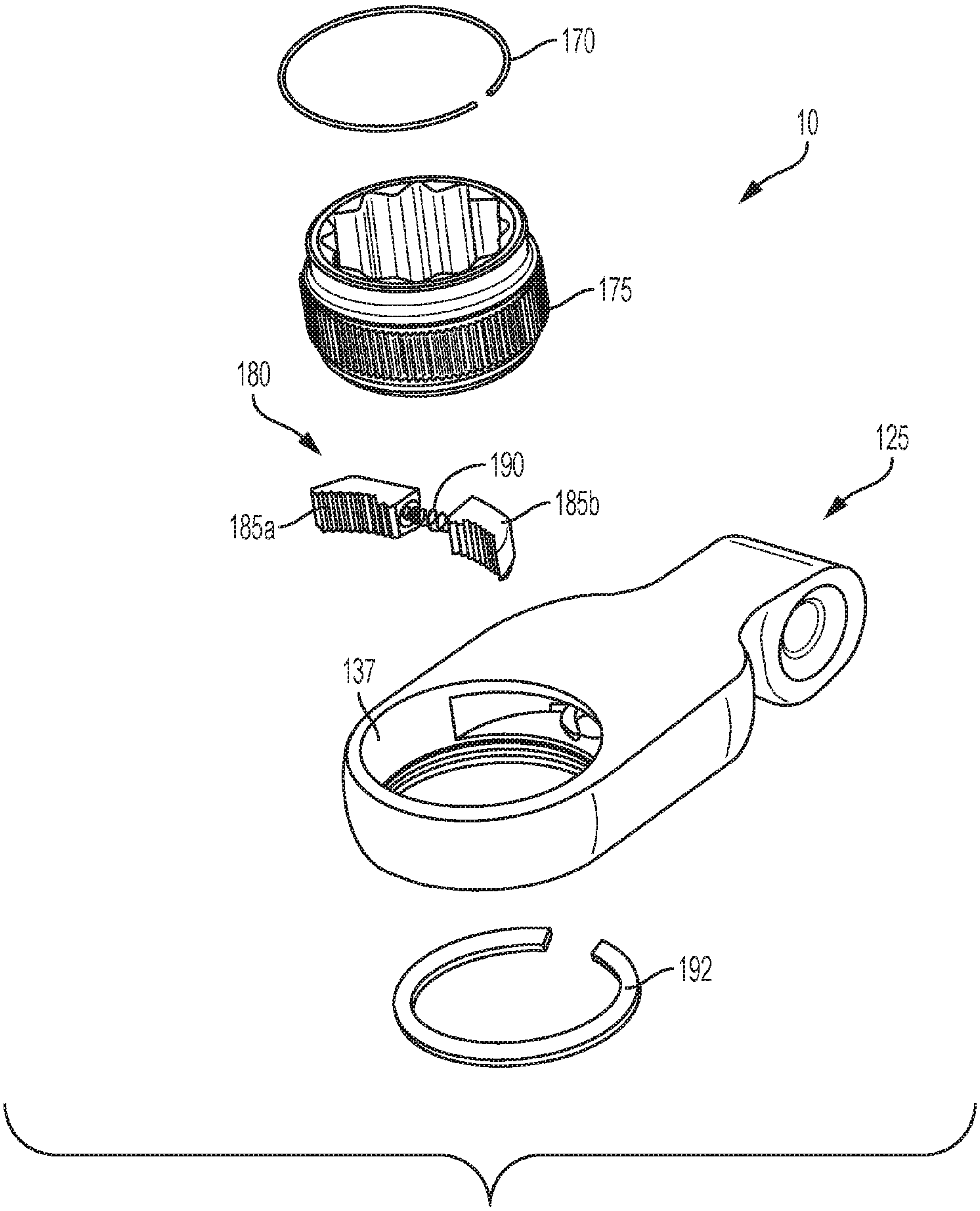
FIG. 4 is an exploded, disassembled lower perspective view of a ratchet head incorporating an embodiment of the present invention.

Referring to FIG. 4, in an embodiment, the ratchet head 10 includes a wear ring 170 that couples the gear 175 to the housing 125 in the opening 137. For example, the wear ring 170 engages a groove in the opening 137 so that when an offset load is applied to the ratchet head 10, the wear ring 170 engages the inside of the opening 137 to prevent excessive wear on the circumferentially disposed teeth of the gear 175. In an embodiment, the ratchet head 10 also includes a pawl mechanism 180 having pawls 185*a,b* separated by a pawl spring 190, and a retaining ring 192 to retain the gear 175 within the opening 137. It will be appreciated that while the present invention is shown having a two-pawl structure, any type of pawl mechanism (e.g., single) will work with the present invention.

The respective teeth of pawls 185*a,b* selectively engage the teeth of gear 175 based on the selection of the user at the reversing lever 100 to operate in either the clockwise or counterclockwise directions. For example, the first pawl 185*a* can be selected and can engage the teeth of gear 175, thereby allowing the tool to operate in the clockwise direction, i.e., apply torque in the clockwise direction and allow the pawl 185*a* to slip or ratchet about the gear 175 in the counterclockwise direction. By selectively rotating the reversing lever 100 to the opposite side, the second pawl 185*b* can then engage the teeth of gear 175 and allow the tool to operate in the counterclockwise direction, i.e., to apply torque in the counterclockwise direction and allow the pawl 185*b* to slip or ratchet about the gear 175 in the clockwise direction. In an embodiment, a pawl spring 190 is disposed between pawls 185*a,b* to bias the pawls 185*a,b* away from each other so the pawls 185*a,b* can apply engagement force against the gear 175 in the most efficient and effective manner possible.

Figure 5:
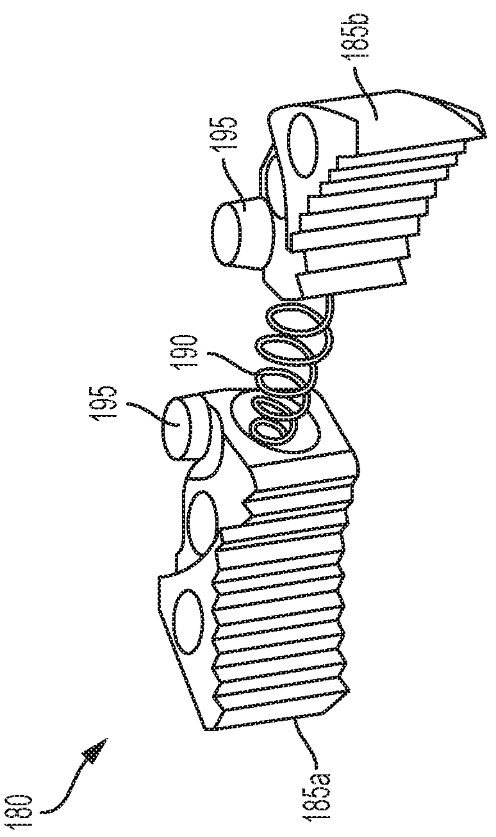
FIG. 5 is a top perspective view of a typical pawl mechanism used with an embodiment of the present invention.
Figure 6:
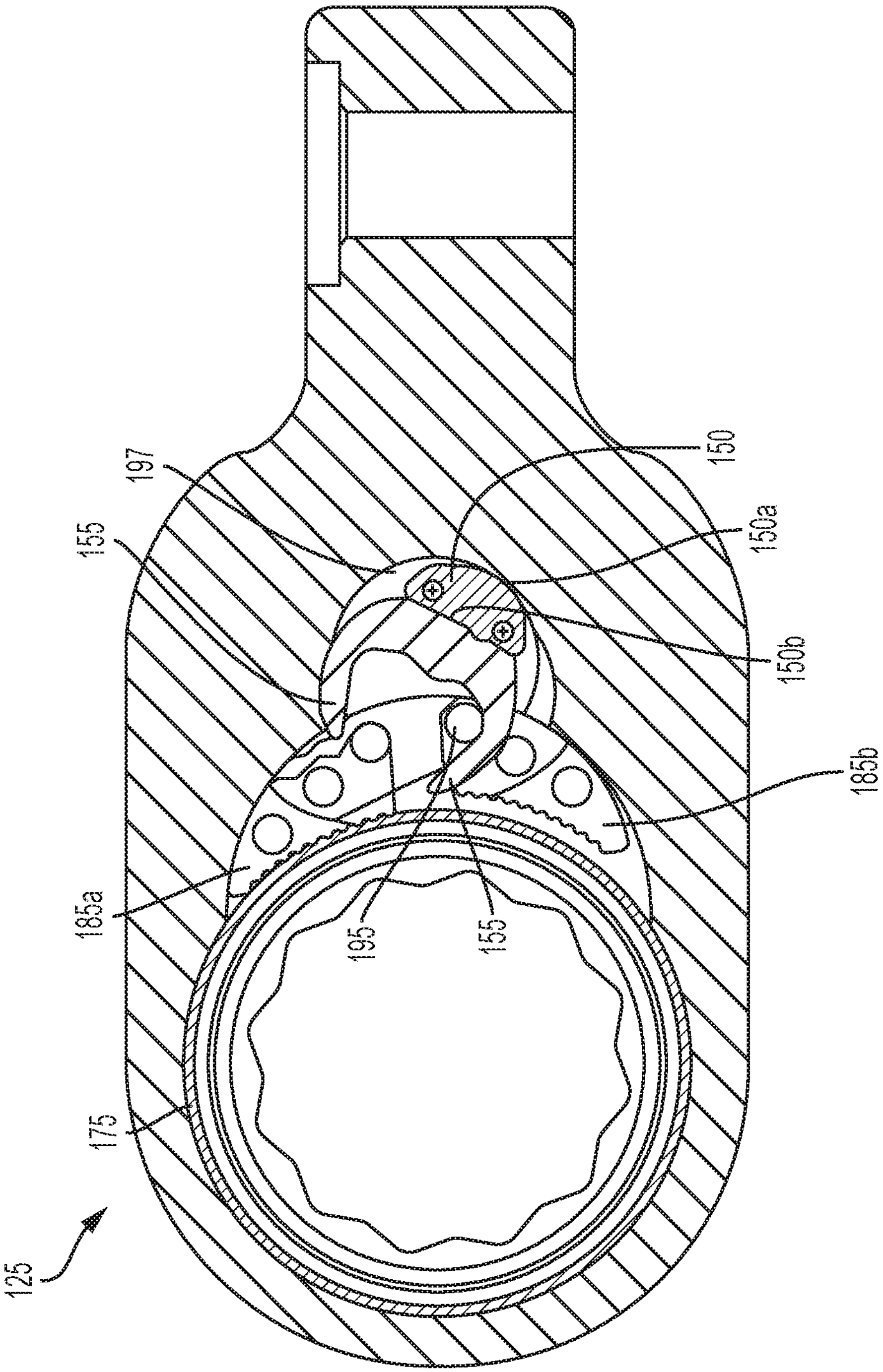
FIG. 6 is a side sectional view of a ratchet head incorporating an embodiment of the present invention.

Referring to FIGS. 5 and 6, in an embodiment, the pawl mechanism 180 can include posts 195 that can be selectively engaged by hooks 155 so that the reversing lever 100 can select a pawl 185*a,b* and cause the opposite pawl 185*a,b* to engage the gear 175 as shown in, for example, U.S. Pat. No. 9,038,507, the contents of which are incorporated by reference herein in their entirety. For example, as shown in FIG. 6, the hook 155 can engage the post 195 of the second pawl 185*b* and thereby cause the first pawl 185*a* to engage the gear 175. Alternatively, the hook 155 can engage the post 195 of the first pawl 185*a* and cause the second pawl 185*b* to engage the gear.

In an embodiment, the body 150 of the upper portion 105 can be located between the internal wall 197 of the ratchet head 10 and the lower portion 110. For example, the body 150 can have a first side 150*a* and a second side 150*b* opposite the first side 150*a*. The second side 150*b* can be located adjacent the lower portion 110 and the first side 150*a* can be located adjacent the inner wall 197 of the ratchet head. By disposing the upper portion 105 in this manner, the body 150 is disposed in a more structurally stable configuration and in a compact manner. For example, the lower portion 110 can first be inserted into the cavity 120 and then moved toward the opening 137. In this manner, the reversing lever 100 does not require a cover plate and screw to enclose the reversing lever 100, but instead, the upper portion 105 of the reversing lever 100 can act as the cover for a smaller area. For example, the base 145 of the upper portion 105 can act as the cover.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A reversing mechanism for a ratchet tool including a ratchet head having a housing, a cavity defined within the housing and being delineated by an internal wall of the housing, an opening defined within the housing, a pawl mechanism including a pawl having a post, and a gear disposed within the opening, the reversing mechanism comprising:

a reversing lever including an upper portion having a lever actuator, a body extending opposite the lever actuator, and a first annular groove on an exterior of the reversing lever and disposed between the lever actuator and body;

a lower portion having a second groove; and a retainer adapted to couple the upper portion to the lower portion by engaging the first annular groove and the second groove, wherein the body is disposed between the internal wall of the housing and the lower portion.

2. The reversing mechanism of claim 1, wherein the retainer is a retaining ring.

3. The reversing mechanism of claim 1, wherein the body includes an indent, and further comprising a ball and a bias member, wherein the bias member biases the ball into engagement with the indent.

4. The reversing mechanism of claim 1, wherein the lower portion includes an extension that inserts into the upper portion to couple the lower and upper portions.

5. The reversing mechanism of claim 1, wherein the lower portion includes a hook adapted to engage the post upon rotation of the lever actuator to engage the pawl against the gear.

6. A reversing mechanism for ratchet tool having a ratchet head including a housing, a cavity defined within the housing and being delineated by an internal wall of the housing, an opening defined within the housing, a pawl mechanism including a pawl and engaging a gear disposed within the opening, the reversing mechanism comprising:

a reversing lever including:

an upper portion including a lever actuator, a body extending opposite the lever actuator, and a first annular groove on an exterior of the reversing lever and disposed between the lever actuator and body;

a lower portion including a second groove; and a retainer adapted to couple the upper portion to the lower portion by engaging the first annular groove and the second groove, wherein the body is disposed between the internal wall of the housing and the lower portion and includes opposing first and second faces, the first face is disposed proximate to the internal wall of the housing and the second face is disposed proximate to the lower portion.

7. The reversing mechanism of claim 6, wherein the retainer is a retaining ring.

8. The reversing mechanism of claim 6, wherein the body includes an indent, and further comprising a ball and a bias member, wherein the bias member biases the ball into engagement with the indent to provide a tactile indication.

9. The reversing mechanism of claim 6, wherein the lower portion includes an extension that inserts into the upper portion to couple the upper and lower portions.

10. The reversing mechanism of claim 6, wherein the lower portion includes a hook and the pawl includes a post, and wherein the hook engages the post to engage the pawl against the gear.

* * * * *